US012787981B2

(12) United States Patent
Lopez et al.

(10) Patent No.: US 12,787,981 B2
(45) Date of Patent: Nov. 10, 2026

(54) PET TOY WITH PROTECTIVE ELEMENTS

(71) Applicants: Saul Lopez, Houston, TX (US); Erik Lopez, Houston, TX (US)

(72) Inventors: Saul Lopez, Houston, TX (US); Erik Lopez, Houston, TX (US)

( * ) Notice: Subject to any disclaimer, the term of this patent is extended or adjusted under 35 U.S.C. 154(b) by 0 days.

(21) Appl. No.: 18/322,690

(22) Filed: May 24, 2023

(65) Prior Publication Data

US 2023/0397575 A1 Dec. 14, 2023

Related U.S. Application Data

(60) Provisional application No. 63/351,502, filed on Jun. 13, 2022.

(51) Int. Cl.
*A01K 15/02* (2006.01)

(52) U.S. Cl.
CPC .................................. *A01K 15/026* (2013.01)

(58) Field of Classification Search
CPC ...... A01K 15/026; A01K 15/025; A63H 3/14; A63H 3/28
USPC ............................ 446/26, 327, 369; 119/709
See application file for complete search history.

(56) References Cited

U.S. PATENT DOCUMENTS 1,372,351 A * 3/1921 Hurlstone-Jones .... A63G 17/00 446/330
1,417,860 A * 5/1922 Reich ....................... A63H 3/14 D2/615
1,529,376 A * 3/1925 Rosenthal ................ A63H 3/48 446/190
2,224,456 A * 12/1940 Janas ....................... A63H 9/00 446/318
2,302,349 A * 11/1942 Renshaw ................. A63H 3/14 446/327
2,655,762 A * 10/1953 Burke ...................... A63H 3/14 446/327
2,729,024 A * 1/1956 Guttmann ................ A63H 3/14 273/440
2,795,896 A * 6/1957 Snyder ..................... A63H 3/14 446/329
2,929,170 A * 3/1960 Brown ..................... A63H 3/14 446/329

(Continued)

FOREIGN PATENT DOCUMENTS

JP H11313984 A * 11/1999

*Primary Examiner* — Peter M Poon
*Assistant Examiner* — Angelica Alejandra Almeida Bonnin
(74) *Attorney, Agent, or Firm* — Tatonetti IP

(57) ABSTRACT

A plush pet toy in the shape of an animal is configured with an arm sleeve opening that enables users to insert their hand and manipulate the pet toy's exterior elements from the inside. The pet toy is designed with protective elements, including a padding material for the hand portion and a comfortable and durable arm sleeve with an elastic portion for a secure grip. Exemplary sensory features include a squeaking toy tucked away in its chin and a tail that crinkles when touched or squeezed. The user can manipulate the pet toy's arms and head in various directions, limited only by the user's hand and finger movement capabilities. The appendage ends of the pet toy are reinforced, and the user's hands are prevented from entering the limb's ends so that the pet can bite and play with the ends of the limbs while the human remains protected.

11 Claims, 7 Drawing Sheets

(56) References Cited

U.S. PATENT DOCUMENTS

| | | | | | |
|---|---|---|---|---|---|
| 3,041,778 | A * | 7/1962 | Seron | A63H 3/14 | 446/87 |
| 3,106,041 | A * | 10/1963 | Kahn | A63H 3/16 | 2/206 |
| 3,226,849 | A * | 1/1966 | Rosin | A63H 3/14 | 446/329 |
| 3,911,618 | A * | 10/1975 | Gerst | A63H 3/14 | 446/329 |
| 3,918,180 | A * | 11/1975 | Chamberlin | A63H 33/38 | 446/151 |
| 3,942,283 | A * | 3/1976 | Rushton | A63H 3/14 | 446/369 |
| 4,010,570 | A * | 3/1977 | Kohler | A63H 3/14 | 446/394 |
| 4,054,006 | A * | 10/1977 | Estlund | A63H 3/14 | 446/329 |
| 4,173,842 | A * | 11/1979 | Bahner | A63H 3/14 | 446/382 |
| 4,280,292 | A * | 7/1981 | Hills | A63H 3/14 | 40/538 |
| 4,300,307 | A * | 11/1981 | Biasuzzi | A63H 3/02 | 446/328 |
| 4,304,065 | A * | 12/1981 | Baiera | A63H 3/14 | 472/70 |
| 4,488,315 | A * | 12/1984 | Hoerlein | A63H 3/14 | 2/91 |
| 4,540,176 | A * | 9/1985 | Baer | G06F 3/03542 | 446/302 |
| 4,601,670 | A * | 7/1986 | Williams | A63H 3/14 | 446/327 |
| 4,681,555 | A * | 7/1987 | Natiw | A63H 3/02 | 446/327 |
| 6,394,874 | B1 * | 5/2002 | Kubo | A63H 3/14 | 446/391 |
| 6,699,100 | B1 * | 3/2004 | Burns | A63H 3/02 | 446/369 |
| 8,062,087 | B1 * | 11/2011 | Davis | A63H 3/14 | 446/26 |
| 11,985,955 | B2 * | 5/2024 | Barker | A01K 15/02 | |
| 2004/0102133 | A1 * | 5/2004 | Yarbrough | A01K 15/025 | 446/327 |
| 2005/0042972 | A1 * | 2/2005 | Mann | A01K 15/026 | 446/183 |
| 2005/0101220 | A1 * | 5/2005 | Jackson | A63H 3/02 | 446/369 |
| 2005/0121339 | A1 * | 6/2005 | Tepper | A01K 15/026 | 119/707 |
| 2005/0211719 | A1 * | 9/2005 | Vani | A47K 10/426 | 221/63 |
| 2006/0057933 | A1 * | 3/2006 | Bricker | A63H 33/004 | 446/327 |
| 2006/0099881 | A1 * | 5/2006 | Dodgen | A63H 3/02 | 446/369 |
| 2010/0192281 | A1 * | 8/2010 | Koesterich | A41D 13/08 | 2/167 |
| 2012/0009844 | A1 * | 1/2012 | Waters | A47D 7/00 | 446/369 |
| 2013/0102224 | A1 * | 4/2013 | Pietrafesa | A63H 3/14 | 446/328 |
| 2014/0033986 | A1 * | 2/2014 | Hannan | A01K 13/001 | 119/625 |
| 2015/0257364 | A1 * | 9/2015 | Renforth | B25G 1/04 | 119/708 |
| 2017/0280794 | A1 * | 10/2017 | Parrish | A41D 19/01 | |
| 2017/0360005 | A1 * | 12/2017 | Cao | A01K 15/026 | |
| 2019/0327936 | A1 * | 10/2019 | Millward | A01K 15/025 | |
| 2023/0240266 | A1 * | 8/2023 | Barker | A41D 19/01505 | 2/239 |

* cited by examiner

105

PET TOY WITH PROTECTIVE ELEMENTS

CROSS-REFERENCES TO RELATED APPLICATIONS

This Non-Provisional Utility patent application claims the benefit of and priority to U.S. Provisional Application Ser. No. 63/351,502, filed Jun. 13, 2022, entitled "Pet Toy with Protective and Stimulating Features for Interactive Play and Training," the entire contents of which are hereby incorporated herein by reference.

BACKGROUND

There are a variety of pet toys available in the market. Some require human interaction with their pet; others allow pets to enjoy themselves independently. Many of these pet toys may lack sufficient triggers that can sensorily stimulate pets while simultaneously protecting the human enabler. During interactive play or training, there is a risk of the pet accidentally harming the human, especially when the human's hands or arms are exposed. This risk may limit the human's ability to fully engage in interactive play, train their pet, or enjoy close and tactile interaction with their pet. A pet toy that protects against playful scrapes would be better suited to engage the pet in physical activity, mental stimulation, and bonding opportunities between the pet and the human.

SUMMARY

A plush pet toy in the shape of an animal is configured with an arm sleeve opening that enables users to insert their hand and manipulate the pet toy's exterior elements from the inside. The sleeve and body of the pet toy are constructed with a robust and protective material to prevent the user's fingers, hands, and arms from being harmed when the pet uses its teeth and nails to interact with the toy. The pet toy is adapted with various stimulating sensory features that excite a pet, such as a dog or a cat, while protecting the human user during interactive play and training sessions. Exemplary stimulating sensory features include a squeaking toy tucked away in the pet toy's chin and a tail that crinkles when touched or squeezed. The pet toy includes typical bodily and facial features, like a tail, eyes, ears, and mouth, further stimulating the pet. The user can manipulate the pet toy's upper arms and head in various directions, limited only by the user's hand and finger movement capabilities. Thus, for example, the pet toy's arms and head can be stretched outward in a flying motion or crunched inward to portray timidity. The hands or fists of the pet toy may be reinforced, and the user's fingers are prevented from entering the ends of the pet toy's hands or other limbs so that the pet can bite and play with the limbs, thereby simultaneously stimulating the pet while protecting the human owner. While the hands and fists of the pet toy are shown as being reinforced, other extremities for different animals can also be reinforced, such as the wings for a bird or butterfly or legs for a fox or octopus.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
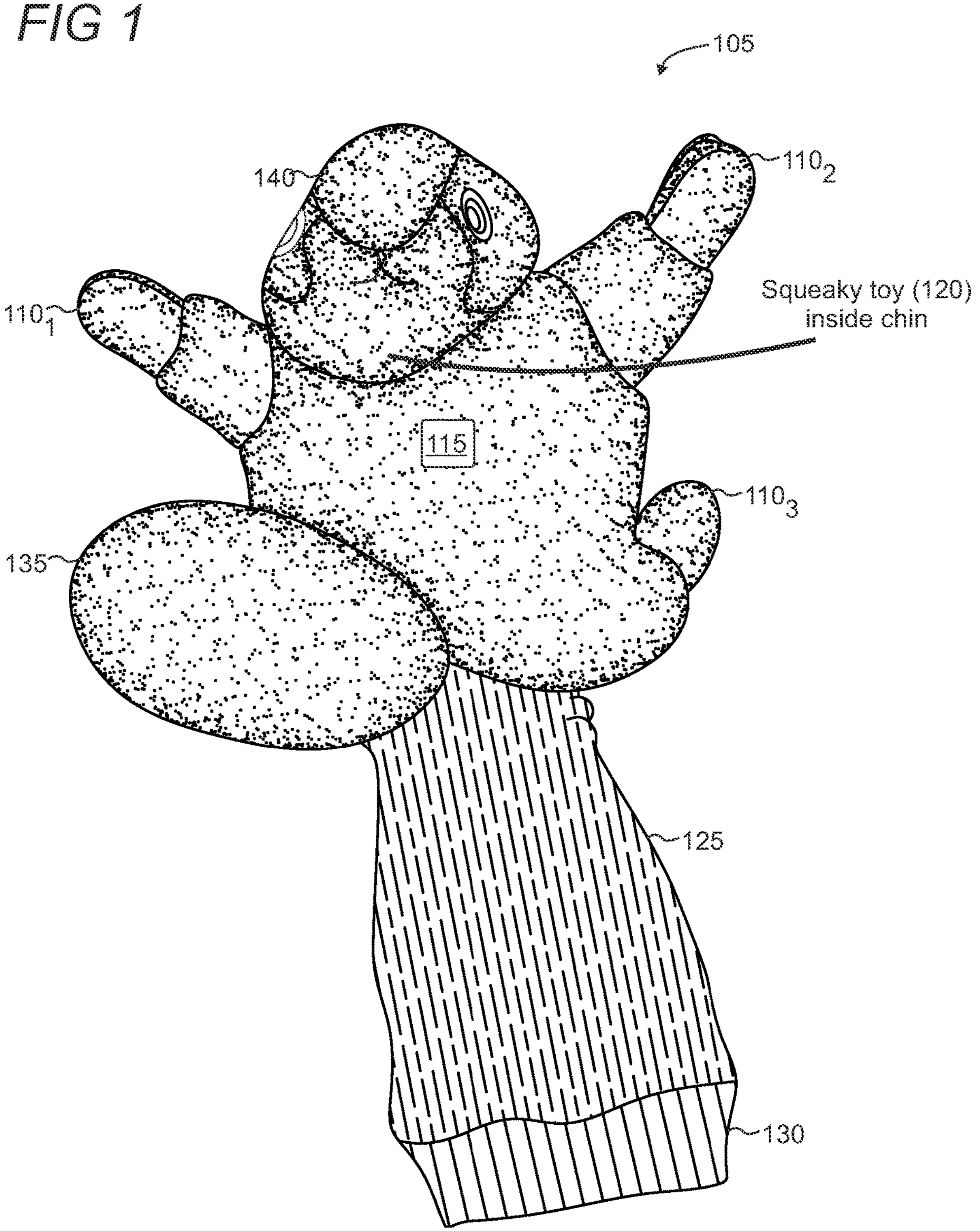
FIG. 1 shows an illustrative representation of a front-side view of a pet toy.

FIG. 1 shows an illustrative representation of a front-side view of a pet toy 105. The pet toy has an interior cavity inside which a user's hand is inserted to manipulate various aspects of the pet toy, such as the pet toy's hands 110 and head 140. The various pet toy hands are labeled $\mathbf{110}_1$, $\mathbf{110}_2$, $\mathbf{110}_3$, and $\mathbf{110}_4$ to represent the front left and right hands and the rear left and right hands. Inside the bottom portion of the head, at the chin, is a squeaky toy 120 tucked inside the chin. The squeaky toy is in between the interior and exterior surfaces of the pet toy to secure it in place. The exterior 115 of the pet toy is a soft plush-like surface to make the material easy on the pet's and owner's hands and increase the aesthetic appeal. However, the hands 110 are tougher and more protective to the touch to provide a stronger material for a pet to chew while simultaneously protecting a user's hands inside the pet toy because they are densely filled with polyester fiber stuffing. However, in some scenarios, each surface may be a multi-layered fabric, and there may be no plush stuffing since some dogs and animals may chew the toy open.

The pet toy 105 is constructed from three layers of material. The first material, which is on the interior of the toy, is a plush tricot fabric that is soft to the touch and rests against the user's skin. The second material functions as a protective layer. It is a 1-2 mm thick felt padding-a densely matted textile affixed through an adhesive lamination process suitable for high-volume manufacturing and flexible for ergonomic usability. The third and exterior layer is a plush fur of varying styles and densities, which functions as the visual outer layer for aesthetic purposes. A thicker felt may be used for further protection, or the space between the plush tricot and felt may be stuffed with polyester fibers. The pet toy includes a tail 135 that extends downward from the pet toy and is adjacent to an arm sleeve 125 into which a user inserts their hand and arm. The arm sleeve includes an elastic portion 130 to grip the user's arm more securely and conform to the user's specific arm properties. In some scenarios, the entire arm sleeve 125 and elastic portion 130 may be a polyester elastic fabric blend to better secure it in place, and also provides some additional protection to the user's arm in case the pet scratches its nails or teeth at that location. As shown, the head includes other conventional features of a plush toy, such as eyes, a mouth, and ears.

Figure 2:
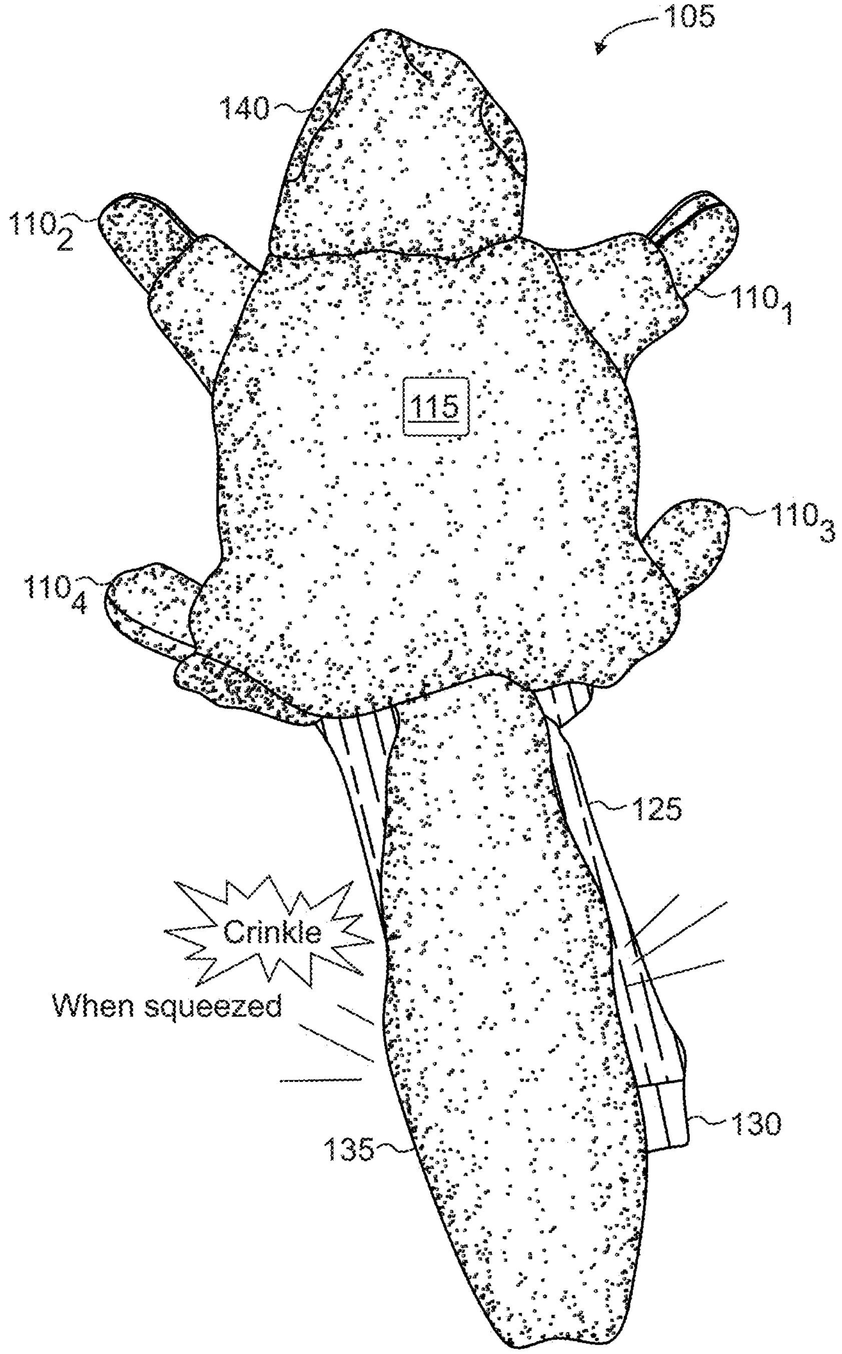
FIG. 2 shows an illustrative representation of a rear-side view of the pet toy.

FIG. 2 shows an illustrative representation of the rear side of the pet toy 105. In this drawing, the tail 135 is better shown and extends straight downward when not manipulated by a user. Inside the tail are one or more materials that create a crinkly-type noise when squeezed or touched, such as paper, plastic, foil, etc., which may be woven or gathered into pleats to create the crinkle sound. The tail is enclosed from the abdomen and body of the animal to secure the pleats therein.

Figure 3A:
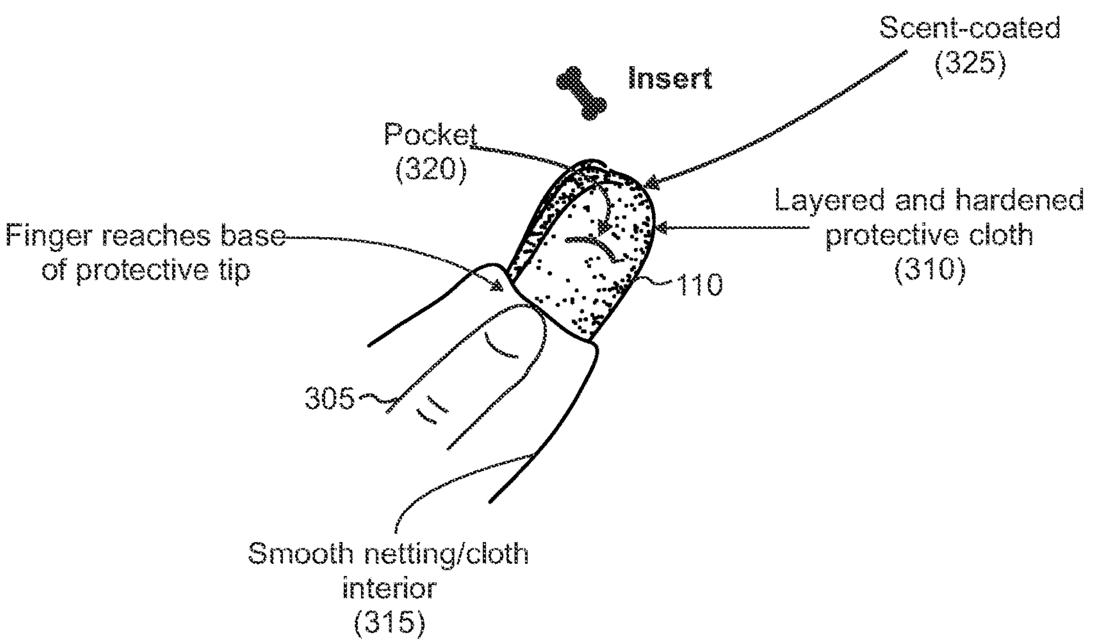
FIGS. 3A and B show various representations of the pet toy's compositional makeup and interior.

FIG. 3A shows an illustrative representation in which a user's finger is inserted inside the interior of the pet toy's arm when the user 305 inserts their hand into the pet toy's cavity. As shown, the user's finger is blocked and prevented from touching or being inserted into the pet toy's hand 110 and is stuck at its base. To prevent user access, the hand is sealed via stitching and/or glue between the arm and hand. This enables the user to manipulate the arm and hand while still giving the pet a piece to chew, bite, and gnaw without harming the user's finger.

The hands 110 are constructed of a layered and densely padded protective fabric 310 to strengthen the hand and protect the user. Although the hand is shown as being protected, the hand section, which may include parts of the arm may also be padded, depending on the circumstances, so sufficient padding is present. The hand may also include a pocket 320 inside which a user can put a treat or toy a pet can access after chewing. In other examples, other limbs may also have a pocket, such as an octopus's arms, a fox's feet, a bird's wings, or an animal's tail. The hand or limbs may also be coated with a scent 325, such as a perfume or odor, that pets enjoy. Furthermore, the interior of the pet toy is comprised of a smooth netting or cloth material 315, as opposed to having a fur-like feel like the exterior 115. The smoother interior surface provides greater grip and manipulation of the pet toy. Although only the interior of the pet toy's arm is shown in FIG. 3A, the smooth netting/cloth interior is present throughout the pet toy's interior, including other arms, the head, and the abdomen.

Figure 3B:
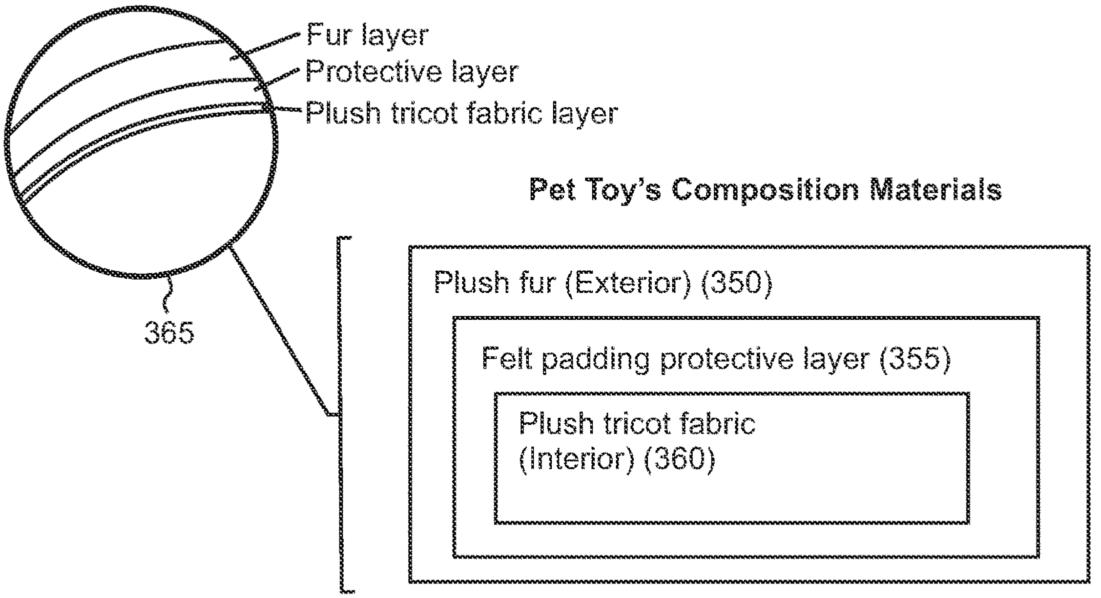

FIG. 3B shows an illustrative representation in which the toy's compositional makeup includes a plush tricot interior 360, a felt padding protective layer 355, and a plush fur exterior 350. Callout box 365 shows a representation of the layers relative to each other, such that, in terms of width, the plush tricot fabric is the smallest layer, the fur layer is the largest, and the felt padding protective layer is in between. The plush tricot fabric is soft to the touch and rests against the user's skin (e.g., hand and fingers during use). The protective layer is a 1-2 mm thick felt padding, which is a densely matted textile affixed through an adhesive lamination process suitable for high-volume manufacturing and flexible for ergonomic usability. The exterior layer is a plush fur of varying styles and densities, which functions as the visual outer layer for aesthetic purposes. Alternatively, a thicker felt may be used with the design imprinted or stitched on directly—removing the need for the third aesthetic layer. For further protection, a thicker felt may be used, or the space between the plush tricot and felt may be stuffed with polyester fibers.

Figure 4:
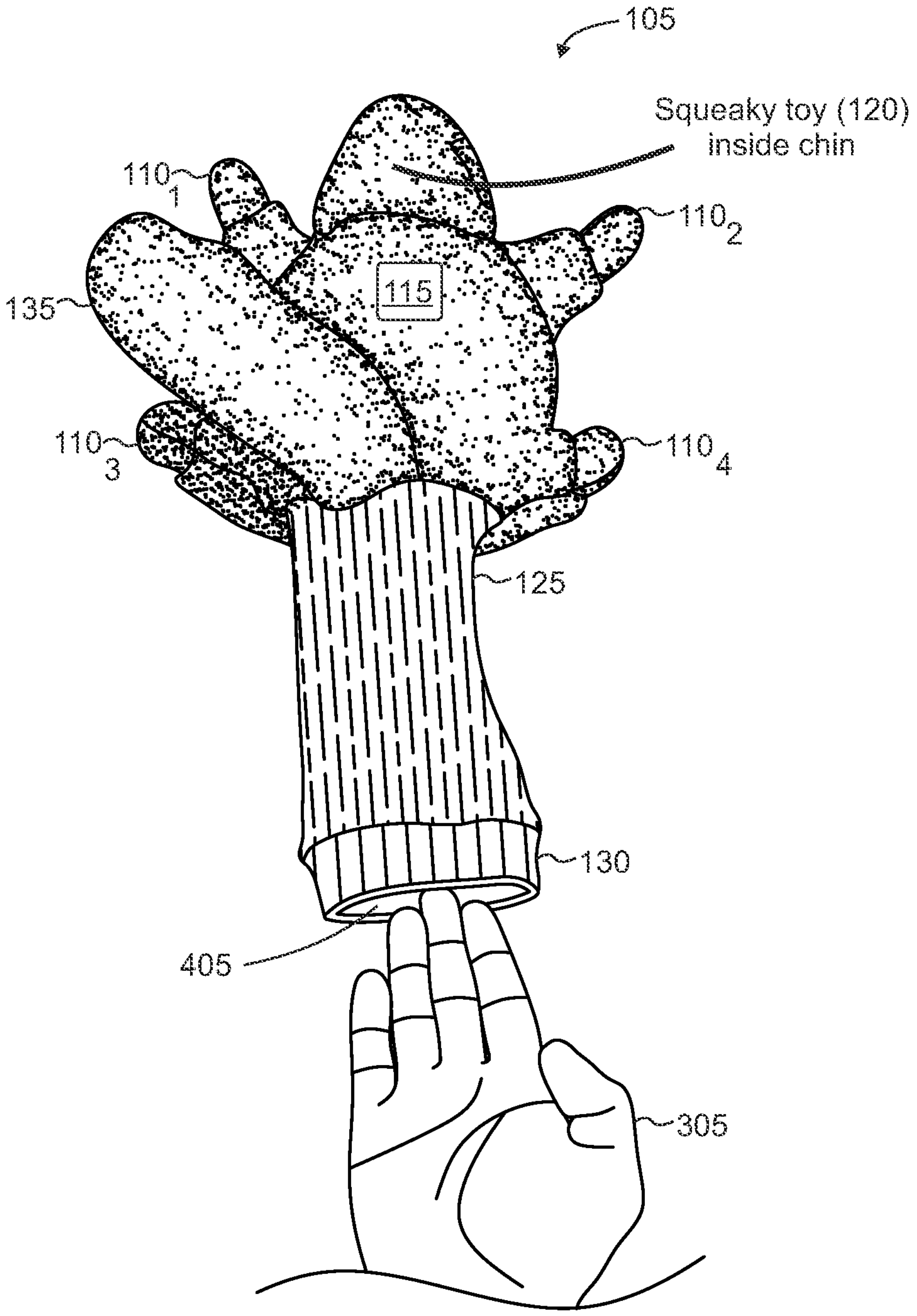
FIG. 4 shows an illustrative representation of a user's hand being inserted into an arm sleeve of the pet toy.
Figure 5:
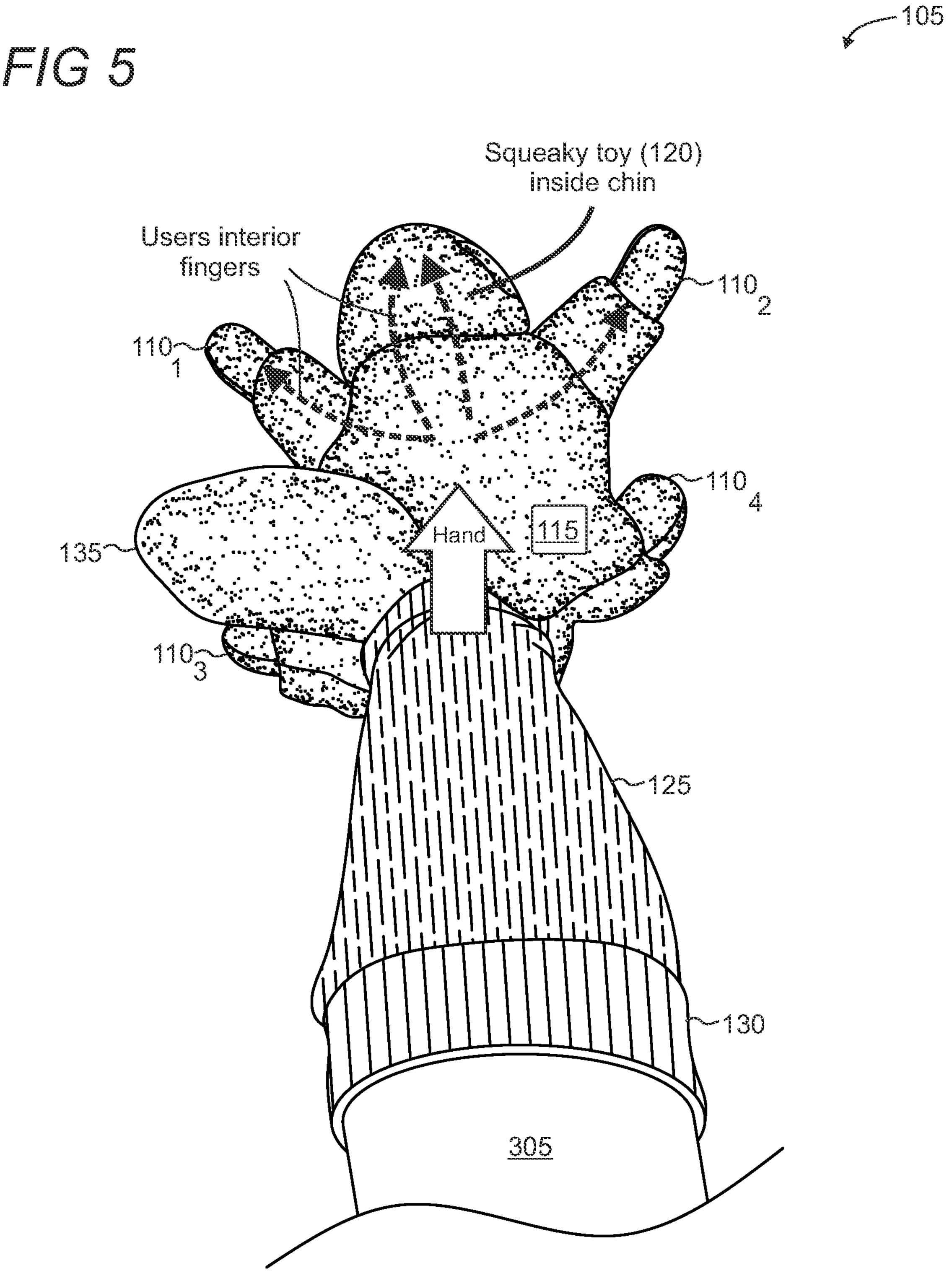
FIG. 5 shows an illustrative representation of the user's arm fully inserted into the pet toy.

FIGS. 4 and 5 show an illustrative representation in which a user 305 inserts their hand into the pet toy's arm sleeve 125 to enter the pet toy's interior cavity. As shown by the dashed arrows in FIG. 5, the user's fingers can advance through the cavity to enter the pet toy's arms and head 140. Interior manipulation of the various components results in external observable movement. FIG. 5, for example, shows the pet toy in a stretched-out position to create a flying-like appearance.

Figure 6:
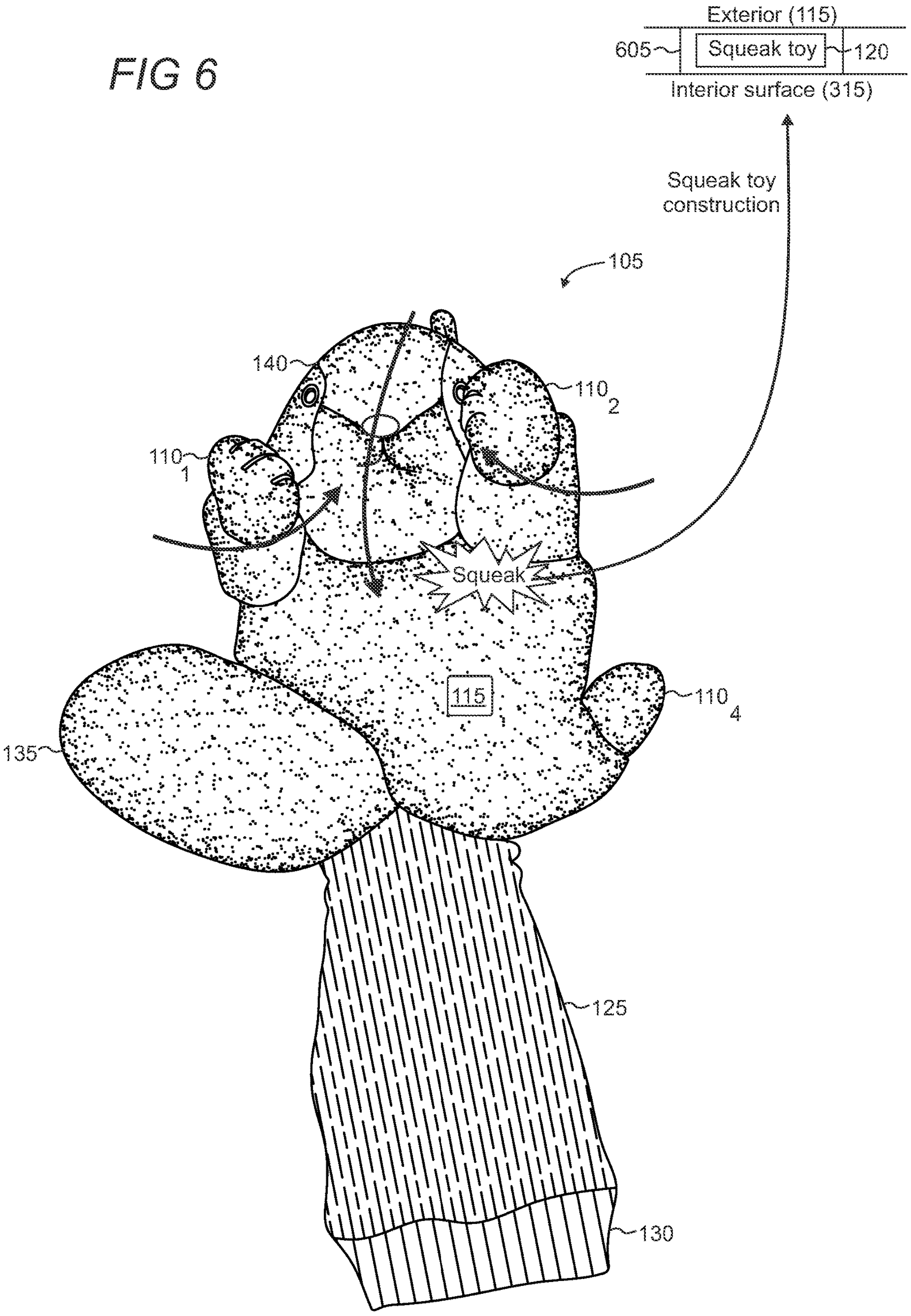
FIG. 6 shows an illustrative representation of the user manipulating the pet toy's upper arms and head inwardly.
Figure 7:
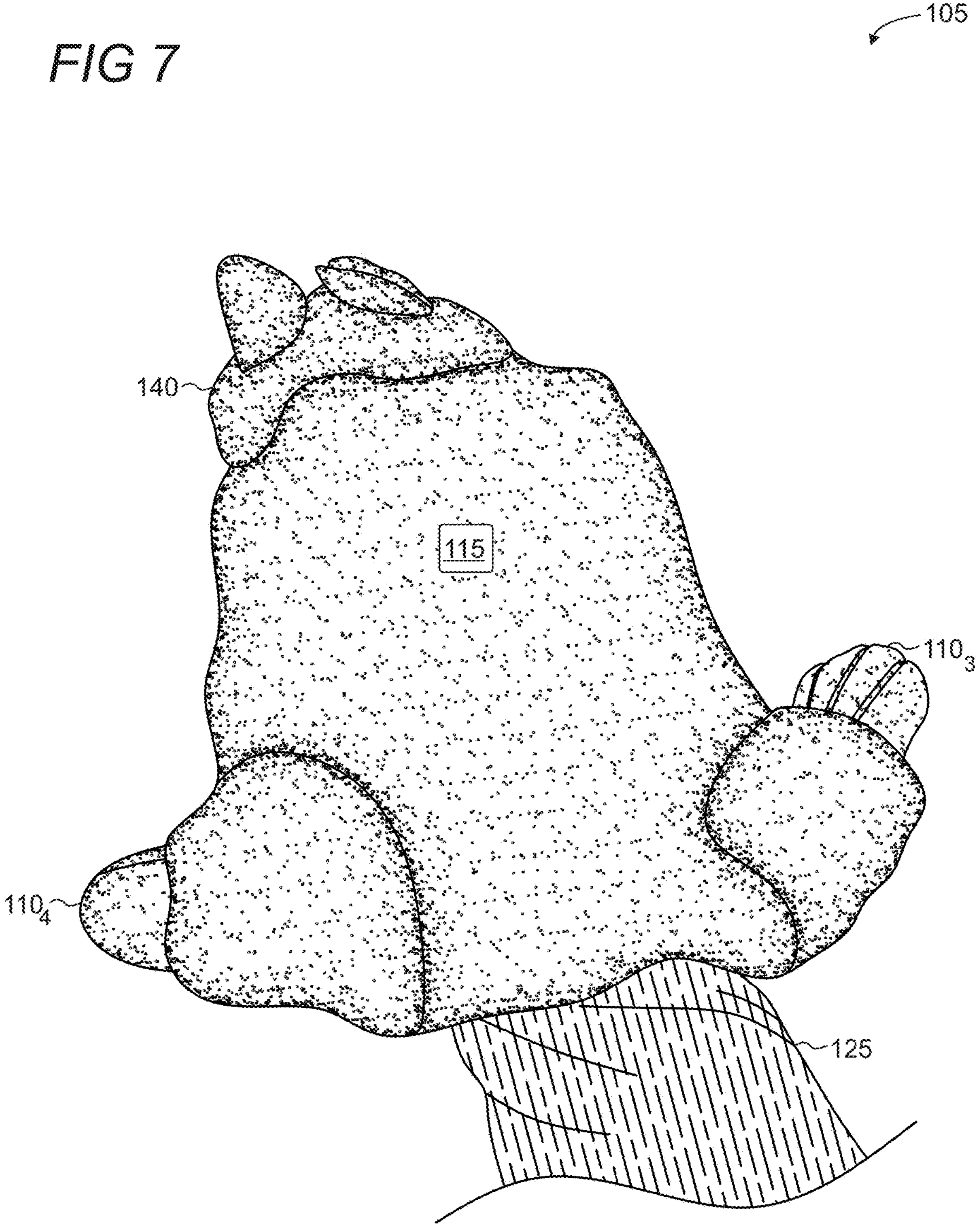
FIG. 7 shows an illustrative representation of the user manipulating the pet toy's upper arms and head inwardly from a rear side view.

FIGS. 6 and 7 show illustrative front-side and rear-side representations, respectively, in which the user manipulates the pet toy by scrunching its arms and head inward toward its abdomen. This results in a timid or boxing-type appearance which helps a user stimulate and play with their pet. Furthermore, squeezing the head's chin downward against the toy's chest (relying on the user's palm or fingers as a backboard) causes the squeak toy 120 to "squeak." As shown in FIG. 6, the squeak toy 120 is positioned inside a pocket 605 between the exterior surface 115 and the interior surface 315. The squeaker may be affixed directly or inside a pocket which may be created via stitching, staples, glue, etc. Thus, users can simultaneously stimulate their pet's visual and auditory sensors to create an even greater interactive experience.

The protective elements of the toy 105 can be used as a platform upon which new models or animals may be built. Exemplary key elements of this platform which every instance must have, is the combination of interior felt laminate to protect the user's hand and elastic sleeve to protect the user's arm while helping to maintain the toy in place during play. The protective elements are the foundation upon which other stimulating elements can be added. For example, in the bird, the tail feathers can be bungee lures which can be used for stimulating interactive play with dogs and cats. A fox can have thick rope features for arms and legs, which can be used to play tug. These lure and tug features can be situated and constructed such that a single element has two extremities for playing, to enhance durability and prevent the stitching from coming loose if they would be singularly affixed to the body.

Various exemplary embodiments are disclosed herein. In one exemplary embodiment, implemented is a pet toy, comprising: an exterior surface; an interior surface opposite the exterior surface, wherein the interior surface surrounds an interior cavity within the pet toy's abdomen and limbs, an arm sleeve having an opening that leads to the interior cavity; and the hand section being layered and harder relative to the pet toy's plush-like exterior surfaces, in which places where the user inserts their hand inside the interior cavity have a softer surface relative to the hand section.

In another example, a head of the pet toy has an interior cavity that enables user manipulation of the head, and wherein the head includes a squeaky toy inside a pocket on its chin that squeaks responsive to external pressure. A further example includes a tail that is sealed off from the pet toy's interior cavity, and wherein the tail has crinkly material that provides auditory sounds when touched from external pressure. As another example, the interior surface has a smooth surface. In another example, the interior cavity is sealed between the pet toy's arm and hand to prevent a user from inserting a finger into the pet toy's hand while providing a protective surface for the pet to chew and play. As another example, the pet toy may be in the form of a squirrel, fox, dog, cat, lion, bird, raccoon, insect, tiger, octopus, or fish. In another example, the limbs are coated with a scent or sight stimulus. As another example, the limbs are adapted with a pocket inside which treats are positionable.

In another exemplary embodiment, implemented is a pet toy, comprising: an exterior surface; an interior cavity defined by an interior surface, wherein the interior cavity extends within the pet toy's body, including head and limbs; an arm sleeve, providing comfort and protection, which has an opening that leads to the interior cavity that conforms to the user's arm and comprises an elastic portion to provide a secure grip; and the interior cavity of the pet toy having space to accommodate the user's hand, constructed of a layered felt laminate protective material.

In another example, the head of the pet toy has an interior cavity that enables user manipulation of the head, and wherein the head includes a squeaky toy inside a pocket on its chin that squeaks responsive to external pressure. A further example includes a tail that is sealed off from the pet toy's interior cavity, and wherein the tail has crinkly material that provides auditory sounds when touched from external pressure. As another example, the interior surface has a smooth surface. As another example, the interior cavity is sealed between the pet toy's arm and hand to prevent a user from inserting a finger into the pet toy's hand while providing a protective surface for the pet to chew and play. In another example, the pet toy may be in the form of a squirrel, fox, dog, cat, lion, bird, racoon, insect, tiger, octopus, or fish. In another example, the limbs are coated with a scent or sight stimulus. As another example, the limbs are adapted with a pocket inside which treats are positionable. In another example, the arm sleeve is comprised of a scratch-resistant material providing an additional layer of protection for the user's body while using the pet toy with their pet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A pet toy, comprising:
- an exterior surface at least partially a plush material;
- an interior surface comprised of a fabric opposite the exterior surface, wherein the interior surface surrounds an interior cavity within an abdomen and limbs of the pet toy;
- a padding protective layer positioned between and throughout the exterior and interior surfaces, wherein the exterior surface is a largest layer, the interior surface is a smallest layer, and the padding protective layer is a size between the exterior and interior surfaces sizes;
- an arm sleeve having an opening that leads to the interior cavity; and
- a hand section of the pet toy being layered and harder relative to the pet toy's at least partially comprising plush material exterior surface, in which places where a user inserts his or her hand inside the interior cavity have a softer exterior surface relative to the hand section of the pet toy, and wherein the hand section includes a pocket inside which one or more items are stored,
- wherein the interior cavity is sealed between the pet toy's arm and hand section to prevent a user from inserting a finger into the pet toy's hand while providing a protective surface for the pet to chew and play, such that the pocket is inaccessible to the user's finger since the hand section is sealed from the pet toy's arm; and
- a head of the pet toy that is accessible from the interior cavity and which enables user manipulation of the head, and wherein a chin of the head includes a pocket between the exterior surface and the interior surface that holds a squeaky toy that squeaks responsive to external downward pressure from the pet toy's chin against its chest.

2. The pet toy of claim 1, wherein the interior surface has a smooth surface.

3. The pet toy of claim 1, wherein the pet toy is any one of a squirrel, fox, dog, cat, lion, bird, raccoon, insect, tiger, octopus, or fish.

4. The pet toy of claim 1, wherein the limbs are coated with a scent or sight stimulus.

5. The pet toy of claim 1, wherein the limbs are adapted with a pocket inside which treats are positionable.

6. A pet toy, comprising:
- an exterior surface at least partially a plush material;
- an interior cavity defined by an interior surface, wherein the interior cavity extends within a body of the pet toy, including a head and limbs, wherein the interior cavity is comprised of a plush tricot fabric;
- a felt padding protective layer positioned between and throughout the exterior and interior surfaces, wherein the exterior surface is a largest layer, the interior surface is a smallest layer, and the felt padding protective layer is a size in between the exterior and interior surfaces sizes;
- an arm sleeve, providing comfort and protection, which has an opening that leads to the interior cavity that conforms to an arm of the user and comprises an elastic portion to provide a secure grip; and
- the interior cavity of the pet toy having space to accommodate a hand of the user, constructed of a layered felt laminate protective material,
- wherein the interior cavity is sealed between the pet toy's arm and a hand section to prevent a user from inserting a finger into the pet toy's hand while providing a protective surface for the pet to chew and play, such that a pocket within the hand section is inaccessible to the user's finger since the hand section is sealed from the pet toy's arm;
- the head of the pet toy has an interior cavity that enables user manipulation of the head, and wherein a chin of the head includes a pocket between the exterior surface and the interior surface that holds a squeaky toy that squeaks responsive to external downward pressure from the pet toy's chin against its chest; and
- a tail that is sealed off from the pet toy's interior cavity, the tail being positioned on a front side of the pet toy such that the arm sleeve is positioned behind the tail, and wherein the tail has a crinkly material that provides auditory sounds when touched from external pressure.

7. The pet toy of claim 6, wherein the interior surface has a smooth surface.

8. The pet toy of claim 6, wherein the pet toy is any one or more of squirrel, fox, dog, cat, lion, bird, raccoon, insect, tiger, octopus, or fish.

9. The pet toy of claim 6, wherein the limbs are coated with a scent or sight stimulus.

10. The pet toy of claim 6, wherein the limbs are adapted with a pocket inside which treats are positionable.

11. The pet toy of claim 6, wherein the arm sleeve is comprised of a scratch-resistant material providing an additional layer of protection for a body of the user while using the pet toy with their pet.

* * * * *